United States Patent
Evans et al.

(10) Patent No.: US 8,793,154 B2
(45) Date of Patent: Jul. 29, 2014

(54) CUSTOMER RELEVANCE SCORES AND METHODS OF USE

(75) Inventors: Michelle Amanda Evans, Seattle, WA (US); Elizabeth Ann High, Seattle, WA (US); Russell Taufa, Seattle, WA (US)

(73) Assignee: Alterian, Inc., Chicago, IL (US)

( * ) Notice: Subject to any disclaimer, the term of this patent is extended or adjusted under 35 U.S.C. 154(b) by 0 days.

(21) Appl. No.: 13/587,789

(22) Filed: Aug. 16, 2012

(65) Prior Publication Data

US 2013/0046760 A1 Feb. 21, 2013

Related U.S. Application Data

(60) Provisional application No. 61/525,041, filed on Aug. 18, 2011.

(51) Int. Cl.
*G06Q 10/00* (2012.01)

(52) U.S. Cl.
USPC ........... 705/7.31; 705/7.11; 706/45; 707/706; 707/722; 707/736

(58) Field of Classification Search
None
See application file for complete search history.

(56) References Cited

U.S. PATENT DOCUMENTS

| | | | |
|---|---|---|---|
| 7,580,868 B2 * | 8/2009 | Fabris et al. | 705/26.41 |
| 7,844,484 B2 | 11/2010 | Arnett et al. | |
| 7,860,933 B2 * | 12/2010 | Kussmaul et al. | 709/206 |
| 8,122,096 B2 * | 2/2012 | Kussmaul et al. | 709/206 |
| 8,150,860 B1 * | 4/2012 | Cierniak et al. | 707/750 |
| 8,166,020 B2 * | 4/2012 | Turkel et al. | 707/713 |
| 8,176,057 B2 * | 5/2012 | Kim et al. | 707/751 |
| 8,195,522 B1 * | 6/2012 | Sonne et al. | 705/26.2 |
| 8,224,856 B2 | 7/2012 | Purdy | |
| 2003/0018838 A1 * | 1/2003 | Houg | 710/57 |
| 2003/0171978 A1 * | 9/2003 | Jenkins et al. | 705/10 |
| 2005/0010484 A1 | 1/2005 | Bohannon et al. | |
| 2007/0067225 A1 * | 3/2007 | Fabris et al. | 705/26 |
| 2007/0078973 A1 * | 4/2007 | Kussmaul et al. | 709/224 |
| 2007/0198510 A1 * | 8/2007 | Ebanks | 707/5 |
| 2007/0214097 A1 | 9/2007 | Parsons et al. | |
| 2008/0016071 A1 * | 1/2008 | Frieden | 707/7 |
| 2008/0086363 A1 | 4/2008 | Kass et al. | |
| 2008/0228695 A1 | 9/2008 | Sifry et al. | |
| 2009/0106697 A1 | 4/2009 | Ward et al. | |
| 2010/0119053 A1 | 5/2010 | Goeldi | |
| 2010/0257183 A1 * | 10/2010 | Kim et al. | 707/748 |

(Continued)

FOREIGN PATENT DOCUMENTS

WO WO 2014/018690 1/2014

OTHER PUBLICATIONS

International Search Report and Written Opinion of the International Search Authority mailed Oct. 26, 2012 in Application No. PCT/US2012/051450, filed Aug. 17, 2012.

(Continued)

*Primary Examiner* — Hung Le
(74) *Attorney, Agent, or Firm* — Carr & Ferrell LLP

(57) ABSTRACT

Systems and methods for determining the shareability of online content and generating customer relevance scores. Exemplary methods for determining the shareability of online content may include obtaining social media data from one or more social media platforms relative to online content, calculating a customer relevance score that represents shareability of the online content, and providing the customer relevance score to an end user client device by the social media intelligence system.

6 Claims, 6 Drawing Sheets

(56) References Cited

U.S. PATENT DOCUMENTS

| | | |
|---|---|---|
| 2010/0318568 A1 | 12/2010 | Tang et al. |
| 2011/0040843 A1* | 2/2011 | Kussmaul et al. ............ 709/206 |
| 2011/0041075 A1* | 2/2011 | Cierniak et al. ............. 715/745 |
| 2011/0119261 A1 | 5/2011 | Qiao |
| 2011/0173264 A1 | 7/2011 | Kelly |
| 2011/0191417 A1* | 8/2011 | Rathod ......................... 709/204 |
| 2012/0072573 A1 | 3/2012 | Bladel |
| 2012/0102172 A1 | 4/2012 | Rathod |
| 2012/0117059 A1* | 5/2012 | Bailey et al. .................. 707/723 |
| 2013/0060649 A1* | 3/2013 | Drew et al. ................... 705/26.1 |
| 2014/0032475 A1 | 1/2014 | Evans et al. |

OTHER PUBLICATIONS

Alterian PLC, Alterian PLC ALN Half Year Results, Nov. 30, 2011, <http://www.bloomberg.com/article/2011-11-30/axic5lk9antM.html>, p. 6 [retrieved on Apr. 17, 2013].

International Search Report and Written Opinion of the International Search Authority mailed May 10, 2013 in Application No. PCT/US2013/028704, filed Mar. 1, 2013.

International Search Report and Written Opinion of the International Search Authority mailed Apr. 22, 2014 in Application No. PCT/US2013/051912, filed Jul. 24, 2013.

\* cited by examiner

CUSTOMER RELEVANCE SCORES AND METHODS OF USE

CROSS-REFERENCES TO RELATED APPLICATIONS

This Non-Provisional U.S. patent application claims the priority benefit of U.S. Provisional Application No. 61/525,041, filed on Aug. 18, 2011 and titled New Sharing and Recommendation Tracking Method. This application also relates to U.S. Provisional Patent Application No. 61/675,784, filed on Jul. 25, 2012 and titled Brand Commitment Score, as well as U.S. Provisional Patent Application No. 61/606,326, filed on Mar. 2, 2012 and titled Product Cycle Analysis Using Social Media Data. All of the aforementioned disclosures are all hereby incorporated by reference herein in their entireties including all references cited therein.

FIELD OF THE PRESENT TECHNOLOGY

The present technology relates generally to product cycle analysis, and more specifically, but not by way of limitation, the present technology may be utilized to evaluate how well received a product is amongst consumers, predict buying behaviors, and target consumers based upon their position within a product cycle (e.g., learn, try, buy).

SUMMARY OF THE DISCLOSURE

According to some embodiments, the present technology may be directed to a method for determining the shareability of online content. The method may comprise: (a) obtaining, via a social media intelligence system, social media data from one or more social media platforms relative to online content; (b) calculating, via the social media intelligence system, a customer relevance score that represents shareability of the online content; and (c) providing the customer relevance score to an end user client device by the social media intelligence system.

According to other embodiments, the present technology may be directed to systems for determining the shareability of online content. These systems may comprise: (a) at least one server comprising a processor configured to execute instructions that reside in memory, the instructions comprising: (i) a data gathering module that obtains social media data from one or more social media platforms relative to online content; and (ii) a customer relevance score module that calculates a customer relevance score that represents shareability of the online content and provides the customer relevance score to an end user client device.

According to additional embodiments, the present technology may be directed to a method for determining the shareability of online content. The method may comprise: (a) identifying, via a social media intelligence system, content that is to be tracked to determine the shareability of the content; (b) tracking, via a social media intelligence system, social media conversations of authors related to the content; (c) categorizing, via a social media intelligence system, the social media conversations into one or more shareability classifications by conducting a semiotic evaluation of the social media conversations; and (d) categorizing any of authors and social media conversations based upon the classification of social media conversations into one or more shareability classifications.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION OF EXEMPLARY EMBODIMENTS

Figure 1:
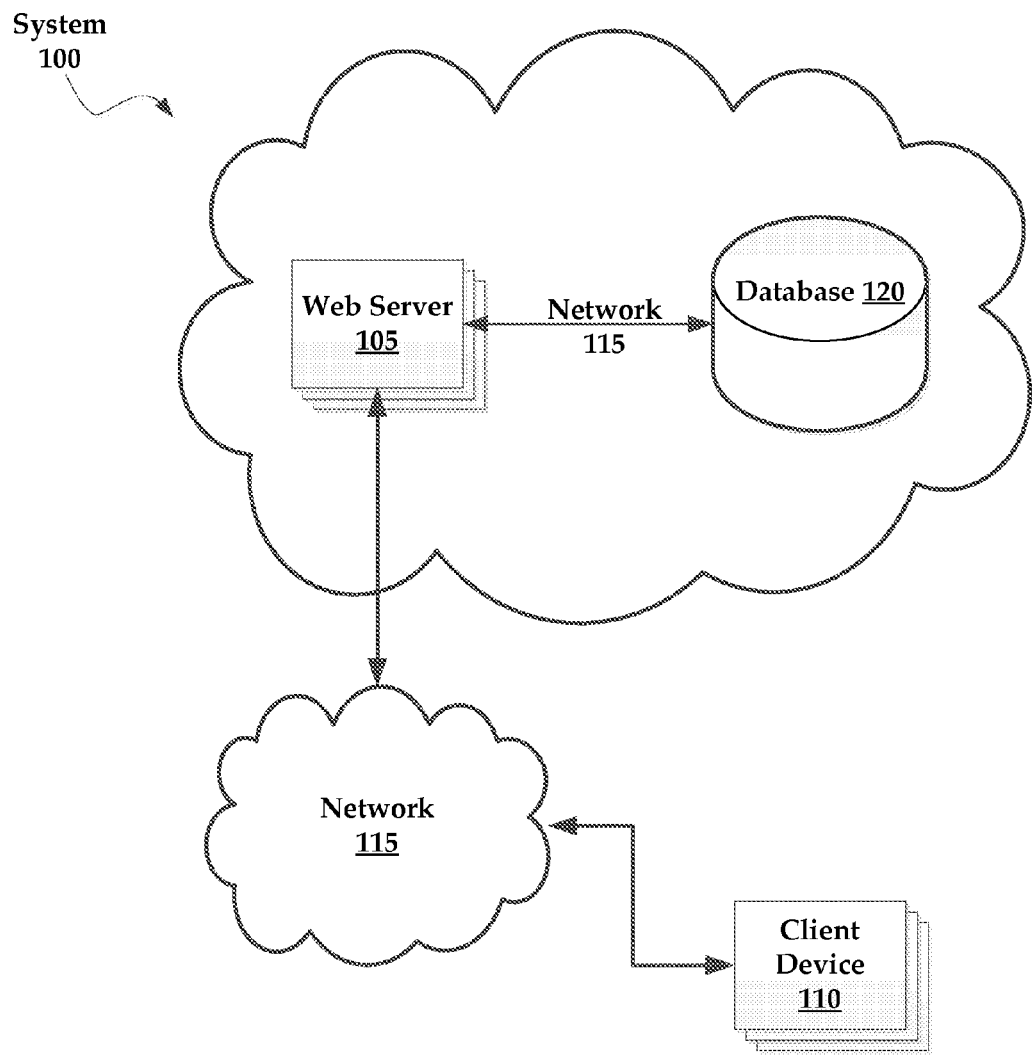
FIG. 1 is a block diagram of an exemplary social media intelligence system.
Figure 2:
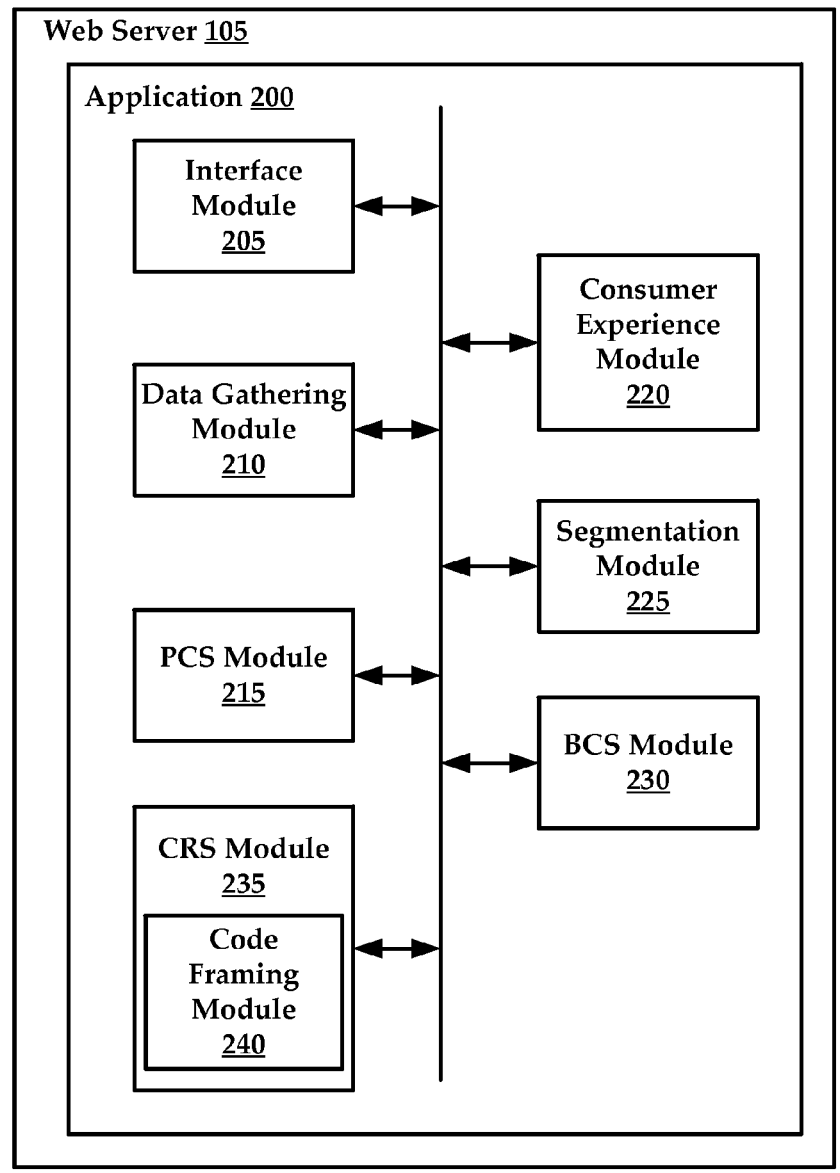
FIG. 2 is a block diagram of an exemplary social media intelligence application for use in accordance with the present technology.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Generally speaking, the present technology is directed to systems, methods, and media that utilize social media data to evaluate consumer behavior and sentiment for a product, relative to a product cycle. The present technology may calculate various scores that indicate how well received a product is amongst consumers. These scores may also be used to predict buying behaviors and target consumers based upon their position within a product cycle. That is, scores may be calculated that represent consumer experiences across many phases of a product cycle (e.g., development, launch, updating, phase out, and the like).

It will be understood that social media data may include, but is not limited to, social media messages, conversations, posts, feeds, updates, statuses, and so forth. Additionally, consumers may be referred to as authors, as those individuals participating in research, trial, and purchase social media conversations are the intended consumers for a particular product and/or service.

Prior to calculating various scores that indicate how well received a product is amongst consumers, the present technology may evaluate social media conversations from authors and categorize the conversations. In some instances, conversations may be categorized as falling within a product commitment score domain, a brand commitment score domain, and/or a customer relevance score domain. Generally speaking, conversations may be categorized by evaluating keywords included in the conversations, and more specifically based upon a frequency of keywords included in these conversations.

In some instances, BCS may be utilized to determine a consumer's emotional connection to a brand. Exemplary emotions associated with the BCS may comprise, but are not limited to, hopefulness, attraction, and/or devotion. These emotions may be tied to segments of the product cycle, such as understand, learn, and commit, customer engagement levels with a particular brand.

The CRS allows marketers to determine the shareability of content. By making content more shareable, marketers can increase website traffic, which may in turn, drive consumer behaviors within the product cycle, such as buying. The CRS may quantify the shareability of content and may be used as a benchmark for comparing the effectiveness of content in driving commercial activity.

Customer relevance scores (CRS) may quantify how like it is that a customer or social network user will share a particular piece of content, such as a video, an article, a website, or other online content within the context of a social network. The CRS gauges the shareability of content. Because it can be demonstrated with empirical evidence that shared content increases revenue more than passive or unshared content, increasing the CRS for content may result in a corresponding increase in revenue attributable to the content. In sum, the CRS may be used to quantify the value of the content, based upon its shareability.

Generally speaking, the present technology may be utilized to determine the shareability of online content. Additionally, the present technology may be utilized to evaluate how and why content is shared. Content that is more frequently shared may be analyzed to determine various elements that make the content shareable, such as narrative, thematic, and underlying message elements. Additionally, the present technology may be used to create code frames from frequently shared content. These code frames (similar to templates) may be applied to other content to increase the shareability of the content. Shareable content may be created from scratch using these code frames.

Advantageously, the present technology may track social media data for online content, such as sharing of the content, downloading of the content, uploading of the content, conversations relating to the content, and so forth. Using this social media data, the present technology may determine the shareability of the content. When content sharing is quantified, the metrics gathered may be utilized to increase key brand metrics, understand and quantify what makes certain content shareable, increase advertising recall, increase correct branding of advertising, increase brand consideration, increase brand recommendation, increase brand favorability, and increase enhanced resonance and acceptance of campaign messages.

In some instances, the present technology may mathematically quantify consumer sentiment relative to a product. Moreover, the consumer sentiment may be extracted from an analysis of content included in social media messages and conversations. Additionally, the portion of the product cycle in which the consumer is currently participating may be determined by an analysis of the words included in their social media data. Therefore, consumer sentiment regarding a product may be determined relative to a time frame associated with at least one phase of a product cycle for the product.

The scores calculated by the present technology may be based upon data included in social media messages of authors (e.g., consumers posting messages on social networks). Thus, social media data obtained from various social media sources may provide valuable and actionable information when transformed by the present technology into various metrics. Each of the metrics/scores/values calculated by the present technology is described in greater detail herein.

Referring to FIG. 1, the present technology may be implemented to collect and evaluate social media data for product cycle analysis. The present technology may be facilitated by a social media intelligence system 100, hereinafter "system 100" as shown in FIG. 17. The system 100 may be described as generally including a one or more web servers that may communicatively couple with client devices such as end user computing systems. For the purposes of clarity, the system 100 is depicted as showing only one web server 105 and one client device 110 that are communicatively coupled with one another via a network 115. Additionally, social media data gathered from various sources (not depicted in FIG. 17) may be stored in database 120, along with various scores, values, and the corresponding data generated by the web server 105, as will be discussed in greater detail below.

It is noteworthy to mention that the network 115 may include any one (or combination) of private or public communications networks such as the Internet. The client device 110 may interact with the web server 105 via a web based interface, or an application resident on the client device 110, as will be discussed in greater detail herein.

According to some embodiments, the system 100 may include a cloud based computing environment that collects, analyzes, and publishes datasets. In general, a cloud-based computing environment is a resource that typically combines the computational power of a large grouping of processors and/or that combines the storage capacity of a large grouping of computer memories or storage devices. For example, systems that provide a cloud resource may be utilized exclusively by their owners, such as Google™ or Yahoo!™; or such systems may be accessible to outside users who deploy applications within the computing infrastructure to obtain the benefit of large computational or storage resources.

The cloud may be formed, for example, by a network of web servers such as web servers 105 with each web server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depend on the type of business associated with the user.

The system 100 may be generally described as a particular purpose computing environment that includes executable instructions that are configured to provide educational and employment based social networks.

In some embodiments, the web server 105 may include executable instructions in the form of a social media intelligence application, hereinafter referred to as "application 200" that collects and evaluates social media data for product cycle analysis. FIG. 18 illustrates and exemplary schematic diagram of the application 200.

The application 200 is shown as generally comprising an interface module 205, a data gathering module 210, a Product Commitment Score (PCS) module 215, a consumer experience module 220, and a segmentation module 225. It is noteworthy that the application 200 may include additional modules, engines, or components, and still fall within the scope of the present technology. As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality. In other embodiments, individual modules of the application 200 may include separately configured web servers.

Generally speaking, the user interface module 205 may generate a plurality of graphical user interfaces that allow end users to interact with the application 200. These graphical user interfaces may allow end users to input information that is utilized by the system 100 to capture and analyze social media data. The information input by end users may include product information for products they desire to evaluate, the product cycle or a portion of the product cycle of interest, the type of consumers or messages they desire to analyze, and so forth.

Initially, the data gathering module 210 may be executed to obtain social media data from one or more social media platforms. End users may establish profiles that define what types of social media data are to be gathered by the data gathering module 210. For example, a software developer may desire to gather social media data regarding consumer sentiment for a particular application.

The data gathering module 210 may evaluate social media data for keywords, groups of keywords, or search queries that are utilized to search social media platforms for conversations or messages that include these keywords.

Figure 3:
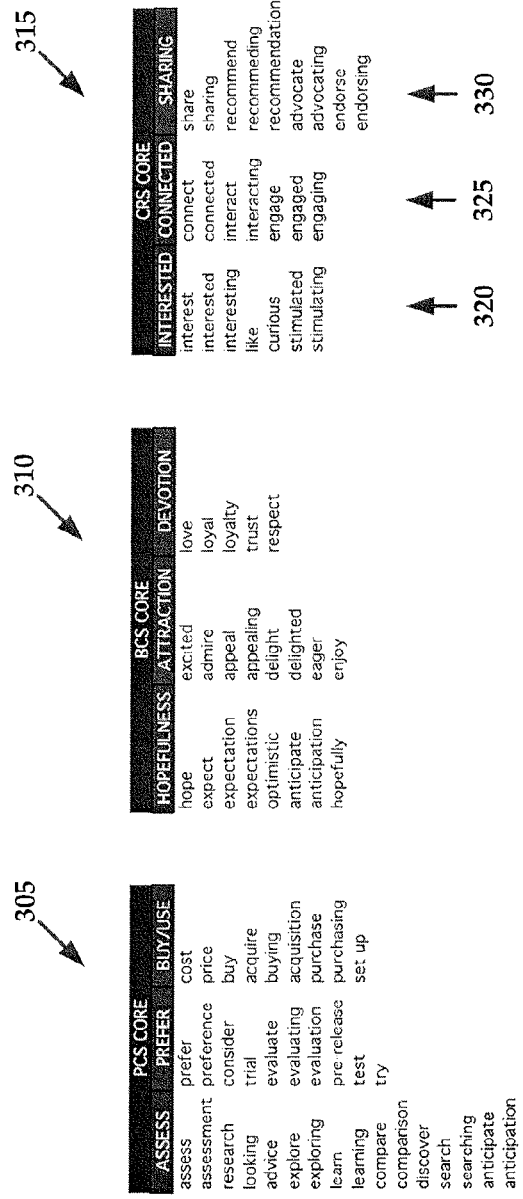
FIG. 3 illustrates exemplary keyword matrices for categorizing social media conversations.

FIG. 3 illustrates various matrices that may be used to semiotically evaluate social media conversations. If a social media conversation has a predominant number of keywords that fall in the customer relevance score (CRS) matrix, the conversation may be categorized as falling within the CRS domain. Thus, a CRS equation may be utilized to calculate a CRS for the social media conversation, as will be discussed in greater detail below.

PCS core keywords are shown in matrix 305, while BCS core keywords are included in matrix 310. CRS core keywords are included in matrix 315, which includes column 320 of Interested, column 325 of Connected, and column 330 of Sharing. Each of these columns may be associated with a shareability classification. Thus, keywords in a social media conversation may place the conversation into one or more of these classifications, namely Interested, Connected, Sharing, respectively. For example, if a social media conversation included the words sharing and endorsing, which are included in the Sharing column 330, the conversation may be classified within the Sharing classification. The conversation may be placed into more than one classification if the system detects keywords present in the Interested or Connected columns. In some instances, the conversation may be classified by a predominance of classifying words in the conversation. Thus, if the conversation includes a predominate number of Interested keywords, the conversation may be classified as Interested. These classifications may also be weighted such that the inclusion of a predetermined number of Sharing keywords automatically causes the conversation to be classified with the Sharing classification, regardless of how many other Interested or Connected keywords are present in the conversation.

In accordance with the present disclosure the selection of social media data may be influenced by the specific types of behaviors that a merchant is attempting to quantify. In other embodiments, the data gather module 210 may analyze the social media data to determine where within the product cycle a consumer currently resides, for example, in the awareness, interest, desire, or action phases. Awareness may be inferred from conversations that discuss any of the three key drivers of the product cycle (e.g., learn, try, buy, and the like). Interest in a product may be a strong indicator that a consumer has gone beyond being simply aware of a product. Consumers expressing a desire to purchase a product may be inferred to be a strong indicator that consumers are considering a product for purchase. Additionally, when consumers indicate an active intent to purchase a product, it may be inferred that the consumer is strongly progressing along the buying cycle.

In some embodiments, the data gathering module 210 may obtain social media data from specific types of consumers, and in additional embodiments, based upon where the consumers are positioned within the product cycle, such as those within the research phase. That is, the social media data for a set of consumers may be monitored because they are actively researching products to purchase.

The data gathering module 210 may utilize a conversation matrix to obtain relevant social media data. The data gathering module 210 may employ the conversation matrix to search and capture relevant social media data from social media platforms. The search terms and matrices utilized by the data gathering module 210 may be updated if the data gathering module 210 fails to obtain sufficient data, or if the data that is obtained is inaccurate.

Product Commitment Scores

The PCS module 215 may be executed to calculate various types of PCS values that aid merchants in determining the commitment level of consumers to a particular product. Additionally, the PCS value may be utilized as a leading indicator that may be utilized to predict consumer behavior relative to a particular product or service. For example, the PCS value may be used to predict how well a particular product will be received by consumers. Moreover, the PCS value may be used to predict the likelihood that a product will be purchased and if consumers will remain committed to the product throughout the lifecycle of the product. In one non-limiting example, if the product includes software, the product lifecycle may include conception, product launch, and eventual upgrade of the software by consumers.

The PCS value may represent the difference between the number of positive research, trial, and purchase messages and the number of negative research, trial and purchase messages. Again, these messages include social media messages may be obtained by the data gathering module 210 from evaluating one or more social media platforms. More specifically, these messages or conversations have been previously categorized as belonging to, or being associated with, the PCS domain.

It is noteworthy to mention that the PCS module 215 may calculate individual PCS values at a specific consumer (e.g., author) level. Adjustments and weighting of consumer level PCS values may also be performed by the PCS module 215.

For example, each consumer may contribute to the overall PCS value to the degree of their relative authority. That is, the PCS module 215 may account for a consumer's influence relative to the total influence of all consumers having at least one research, trial or purchase conversation relative to a particular product.

The PCS module 215 may also adjust consumer level PCS values to account for each consumer's influence relative to the influence of all consumers having at least one research, trial or purchase message. That is, the more influential a consumer is, the more weight is attributed to the consumer's conversations. Influence may be inferred because the consumer has a large social network or because the consumer is an expert in the product field.

The overall PCS value may generally comprise a summation consumer level PCS values. In additional embodiments the overall PCS value (and consumer level PCS values) may comprise a summation of three different component values such as a research value, a trial value, and a purchase value, where each of these values may be calculated separately. These three values represent the phases of the product cycle.

In general, each of the three component values may each include a summation of seven different sentiment values. Conceptually, the seven sentiment values exist on a continuum where the first sentiment value indicates a very negative sentiment, and the seventh sentiment value indicates a very positive sentiment. The second through sixth sentiments fall somewhere in between. The distributions of messages/conversations along the spectrum of sentiment values may indicate the success of the product at the different phases of the product cycle.

In some embodiments, messages that are most positive (sentiment score of seven) may receive the most points, whereas the least positive (sentiment score of five) may receive the least amount of positive points. The most negative conversations (sentiment score of one) may receive the greatest number of negative points. Conversations being the least negative (sentiment score of four) may receive the fewest negative points.

As mentioned briefly above, consumer level PCS may also be weighted. For example, a consumer having 100% most positive conversations in the research, trial and purchase categories should get the maximum score of 100. As such, the weight for sentiment seven=100/3=+33.33.

Likewise, a consumer having 100% most negative conversation in the research, trial and purchase categories should get the minimum score=−100. As such, the weight for sentiment 1=−100/3=−33.33.

Consumers that have less negative conversations than sentiment one, a decrease in penalization points of −33.33 may be seen, respecting the original weighting. As consumers have less positive conversations their reward points may be reduced to respect the original weighting.

In sum, the PCS module 215 may consider not only the aggregate number of conversations in each phase of the product cycle, but the sentiment level associated with each conversation. Additionally, the sentiment for each conversation may be weighted based upon consumer characteristics (e.g., mood, influence, etc.). Moreover, the conversations may further be weighted by the authority level of the consumers associated with the conversations. The final PCS (either overall or consumer level) may then be indexed from zero to 100, where 100 indicates that the product scores perfectly through the product cycle or at least one phase of the product cycle.

The present technology may be adapted to adjust the consumer level and overall PCS values based upon various factors. For example, a value calculated for the sentiment of a message may be adjusted for the consumer's general mood, such as when it is known that the consumer is always positive or almost always skeptical and/or negative. In other instances the PCS values may be adjusted based upon the importance of a particular message to the sale of a product or service.

While many methods for calculating and weighting PCS have been disclosed one or ordinary skill in the art will appreciate that other algorithms and weighting methodologies that may be utilized to quantify and predict consumer sentiment and buying behaviors for product cycles are likewise contemplated for use in accordance with the present technology.

PCS values may also be utilized to benchmark a particular product against a competing product. For example, a PCS value for a navigation software application for a first merchant may be compared against a PCS value for similar navigation software from a competing merchant. The PCS value may provide actionable information that allows the first merchant to modify their marketing, consumer service, and/or product features to increase their PCS value. It is noteworthy to mention that PCS values may be generated for merchants at specific intervals, such as daily, weekly, monthly, or quarterly.

According to some embodiments, the consumer experience module 220 may be executed to evaluate portions of the consumer journey (e.g. product cycle) relative to a product. Generally speaking, consumer experience values may comprise mathematical representations of social media data at specific point in time (or a specific time period) along the product cycle. In some instances, the consumer experience scores may include the three PCS component values (e.g., research value, trial value, and purchase value) described above, but analyzed relative to a particular time frame. Therefore, the consumer experience values may be described as more granular and temporally focused portion of the PCS (either intermediate or overall).

Consumers may be previously identified by the data gathering module 210, for example, by identifying consumers in certain types of survey data. Various scores may be generated by the consumer experience module 220 that represent different consumer experiences. These scores/values may be utilized by merchants to improve their products and/or marketing campaigns.

Using the consumer experiences scores, a merchant may explore more detailed metrics regarding the touchpoints surrounding a product. In some instances, the consumer experience scores may be generated by conducting a more detailed evaluation of consumer's social media data relative to the calculation of a PCS. Therefore, the conversation matrices employed by the data gathering module 210 may be modified (e.g., may include greater detail) to capture more specific portions of social media conversations/messages across each phase of the product cycle.

The consumer experience module 220 may also generate optimal consumer journey models that enable merchants to plan effective product development and marketing strategies, while also allowing for course correction when products or marketing fail to produce acceptable consumer experiences.

According to some embodiments, the segmentation module 225 may be executed to determine and develop actionable priorities tailored to specific consumer types. The segmentation module 225 may cluster consumers based on a variety of factors using a segmentation model that considers product cycle components and likelihood of purchasing a product. The segmentation module 225 may utilize the social data gathered by the data gathering module 210. Additionally, the segmentation module 225 may generate feedback for consumer segments in near real-time, specifically for consumers that are the most (and alternatively the least) likely to purchase a particular product.

In some embodiments, the data gathering module 210, consumer social media data may be obtained from groups of consumers engaged in traditional marketing or consumer research activities. Consumers may be queried for a social networking identifier (e.g., handle, profile, username, etc.) such that the data gathering module 210 may collect social media data for that consumer. When social media data is obtained, the segmentation module 225 may link or correlate the social media data with primary research data, such as data obtained from traditional marketing or consumer research activities. The segmentation module 225 may evaluate social media data of the consumer to determine if the consumer is acting in correspondence with the research data gathered about the consumer. Moreover, the segmentation module 225 may also determine if the consumer is influencing other consumers with their social media conversations.

The segmentation module 225 may also use the combined data sets to generate models that allow the segmentation module 225 to predict which social media conversations that should be tracked to glean the most accurate and relevant information about the consumer.

In other embodiments, the segmentation module 225 may utilize the correlated group consumers into categories based upon various factors. For example, very influential consumers who focus on superior customer service may be clustered into a consumer segment.

The segmentation module 225 may segment or cluster the social media data based upon the content of the social media conversations. For example, the segmentation module 225 may evaluate a group of social media messages and determine that two thirds of the consumer's desire superior consumer service, whereas only five percent desire an aesthetically pleasing website. Again, the clustering, as with sentiment analysis, may be conducted based upon keywords included in the social data. As with PCS values and consumer experience values, the segmentation module 225 may determine the segmentation of social media data based upon certain algorithms, mathematical, and/or statistical methodologies. According to some embodiments, the segmentation module 225 may employ statistical methodologies such as clustering ensembles. The clustering of consumers allows the merchant to direct more resources to consumer service efforts and away from website development. As consumer sentiments change, so may the segmentation, and thus the priorities of the merchant.

Brand Commitment Scores

Based upon the categorization of the social media conversation as being within the BCS domain, the BCS module 230 may be executed to calculate a BCS for a social media conversation. According to some embodiments, the BCS quantifies brand affinity for a particular consumer or group of consumers. The BCS may also quantify the consumer's emotions regarding the brand. The BCS may provide a metric, which allows merchants to build relationships between customers and brands.

The BCS is a composite calculation that encompasses the understand, explore, and commit segments of the brand affinity journey. The BCS relates to the brand affinity journey inasmuch as the understand segment of the brand affinity journey is associated with hopefulness, the explore segment of the brand affinity journey is associated with attraction, and the commit segment of the brand affinity journey is associated with devotion. Keywords conveying these emotions may be used to categorize a social media conversation as falling within the brand commitment domain.

In greater detail, the hopefulness emotion attempts to quantify what is important to a customer. Common keywords associated with hopefulness may comprise, but are not limited to hope, expect, optimistic, and so forth. Using this metric, merchants may be able to align expectations of their consumers with their brand. Merchants may tailor their branding and/or marketing to set a level of expectation regarding their products and long-term relationship with customers. The branding of an organization or products can be utilized to build and maintain an emotional connection with consumers which can be leveraged to drive sustained purchasing behavior for products and advocacy in content engagement.

The attraction emotion attempts to quantify if the brand properly reflects who their customers are. Common keywords associated with attraction may comprise, but are not limited to excited, admire, appeal, and so forth. Using this metric, merchants may be able to identify reconciliation when needed. Merchants may tailor their branding and/or marketing to ensure that their products are being advertised and/or branded in accordance with the needs of their customers. These needs may comprise reputation, quality, popularity, and so forth.

The devotion emotion attempts to quantify how deeply the consumer is committed to the brand. Common keywords associated with devotion may comprise, but are not limited to love, loyal, trust, and so forth. Using this metric, merchants may be able to identify a relationship status between a brand and a consumer. The more devoted the customer is to the brand, the more committed the customer will be to purchasing the product associated with the brand. Merchants may wish to tailor their branding or marketing to drive up customer devotion and identify consumers with lagging commitment.

Because these metrics and resultant BCS may be tracked over time and per author, the merchant may determine how changes in marketing and/or branding strategies affect these different consumer emotions. BCS may be calculated for groups or consumer segments such as demographic, psychographic, or other common consumer segmentations that would be known to one of ordinary skill in the art with the present disclosure before them.

An exemplary algorithm (Equation A) for calculating a BCS for a social media conversation is provided below:

$$\Sigma(Ar/\Sigma Ar)*Cw*Sa \qquad \text{(Equation A)}$$

where an author rank score Ar is first calculated for each of a group of authors. The group of authors may consist of all known customers or alternatively, a subgroup of customers. An author rank may be calculated by determining an influence for an author. The influence of an author may be determined for example, by a number of connections for the author (e.g., followers, contacts, etc.). The social status of an author may also be considered. For example, an influential celebrity may have their conversations ranked more highly than an average consumer.

Once an author rank score has been calculated for each author in the group of authors, the author rank score for the author of the comment may be divided by a sum of the author rank scores for each author in the author group to generate an adjusted author rank score. The author rank scores and/or adjusted author rank score may be calculated over a given period of time, relative to a particular product. Thus, BCS may be calculated over time to provide merchants with indices or metrics that quantify how well their branding efforts are being received by consumers.

Next, a component weight Cw for the conversation may be multiplied with the adjusted author rank score. The component weight may comprise previously established scaling factors for each stage of the product cycle. For example, the understand/hopefulness scaling factor may be approximately 0.15, whereas the explore/attraction scaling factor may be approximately 0.25. Additionally, the commit/devotion scaling factor may be approximately 0.6. Thus, the most important scaling factor for component weight relative to the BCS is the commit/devotion scaling factor. Advantageously, the commit/devotion scaling factor may be attributed more weight because the BCS attempts to determine a brand commitment level for consumers. Therefore, devotion may be strongly correlated to brand commitment, whereas hopefulness and/or attraction are less likely to be indicative of brand commitment, although they may be contributory to some degree.

As mentioned previously, the component weighting for each of these three scaling factors may be determined based upon empirical evidence, such as the evaluation of social media conversations of trustworthy authors. For example, a plurality of conversations gathered from various trustworthy consumers may be utilized as the basis for setting the weight of individual scaling factors.

Additionally, the BCS may be weighted based upon consumer sentiment Sw as described in greater detail above. Thus, the system may calculate a sentiment weight for consumers who are consistently positive, negative, neutral, or otherwise amicable to sentiment categorization. This consumer sentiment Sw may be utilized to alter the BCS for a particular conversation. For example, an author who is consistently negative may have their BCS adjusted based upon a negative conversation. In contrast, the consistently negative author may have their BCS adjusted upwardly if they express devotion within their conversation for a particular brand or product, as it would be unexpected for the author to provide a positive conversation.

Customer Relevance Scores

In some embodiments, based upon the categorization of the social media conversation as being within the CRS domain, the CRS module 235 may be executed to calculate a CRS for online content. According to some embodiments, the CRS may quantify how likely it is, or will be, that a customer or social network user will share a particular piece of content, such as a video, an article, a website, or other online content within the context of a social network.

For example, end users such as marketers may desire to obtain shareability metrics for online content. The data gathering module 210 may be executed to gather social media data regarding the online content. For example, the data gathering module 210 may gather metrics regarding sharing, downloading, uploading, posting, linking, referencing, liking, tagging, or other similar actions for online content that would occur within the context of a social network. The data gathering module 210 may also gather conversations, commentary, blog posts, articles, or other textual information associated with online content. For example, the data gathering module 210 may capture a comment thread associated with a video.

Next, the CRS module 235 may evaluate the social media data to classify the conversations. Shareability classification may be performed by determining if keywords included in the conversations about the online content fall within any of the columns of the CRS core matrix 315 of FIG. 3. Once the social media conversations have been classified, a CRS may be calculated for each conversation, a group of conversations for a particular author, of all conversations for all authors in regard to the online content in question.

An exemplary CRS may be calculated by the CRS module 235 using Equation A provided above. That is, the adjusted author rank score may be calculated in a similar manner described above with regard to the BCS. In contrast with the method for calculating the BCS, the CRS may contemplate different component weights Cw for the conversations. That is, the component weights for the CRS may be associated with the shareability classifications described above such as interested, connected, and sharing. Whereas the BCS related to the understand, explore, commit product cycle segments with hopefulness, attraction, and devotion, the CRS relates to the understand, explore, and commit product cycle segments with interested, connected, and shared.

Thus, the component weight Cw for a conversation may comprise previously established scaling factors for each stage of the product cycle. For example, the understand/interested scaling factor may be approximately 0.15, whereas the explore/connected scaling factor may be approximately 0.25. Additionally, the commit/shared scaling factor may be approximately 0.6. Thus, the fact that the content has been shared is more relevant to the CRS than the keywords that indicate that the consumer is interested in the content. The connected shareability classification may consider how often the consumer mentions their social media connectivity and is therefore more related to shareability that words that simply connote an interest in the content.

As the conversations are evaluated for keywords and classified, the CRS module 235 may determine a shareability level for the online content. For example, if a predominate number of conversations include keywords that fall within the Interested classification, the CRS module 235 may indicate that the online content is likely to pique the interests of consumers.

In accordance with the weightings described above, conversations that predominately involve keywords in the Interested classification will generate lower CRS relative to conversations that predominately involve keywords in the Connected classification. Therefore, conversations that predominately involve keywords in the Shared classification will have the highest relative CRS.

Again, the CRS may be calculated by the CRS module 235 at an author level. Additionally, an average CRS may be calculated for a plurality of authors having social media conversations about selected online content. Moreover, as with the BCS, the CRS may be corrected, weighted, adjusted, or otherwise modified based upon the sentiment score for a particular author.

In sum, Equation A may be employed by the PCS module 215, the BCS module 230, and/or the CRS module 235 to calculate the PCS, BCS, and CRS, respectively. The score calculated by the use of Equation A is dependent upon the initial classification of social media conversations as falling within the PCS, BCS, or CRS domains. Thus, Equation A can be used to calculate PCS for social media conversations falling with the PCS domain, while BCS and CRS may be calculated for conversations falling within the BCS and CRS domains, respectively.

Although not shown in Equation A, the CRS for online content may be augmented by web analytics regarding the online content. For example, the CRS module 235 may determine click counts, share counts, embeds, links, or other quantifiable ways online content may be shared within social networks. These analytics may be used to adjust the CRS. Social media conversations that generate relatively low CRS may be offset by the fact that the content is, in fact, shared more frequently than the conversations imply.

To increase the shareability of online content, the code framing module 240 may be utilized to generate a code frame that may be applied to online content having a relatively low CRS. For example, a code frame may be generated to increase the CRS of online content that falls within the Interested classification, described above.

The content that generated the relatively high CRS may be evaluated by the code framing module 240 using a semiotic analysis to determine categories that define the shareability of content. With regard to semiotics utilized by the code framing module 240, a code or "frame" may be built to understand how various elements of online content work together to create meaning and trigger subconscious sharing impulses in consumers. These elements may be labeled as categories. Significant, but non-limiting categories that trigger subconscious sharing impulses comprise a Narrative category may define the style of the content. A Theme category may define the type of story that the content is attempting to convey. An Underlying Message category may define the moral outcome or other message that the content is attempting to convey. Highly shareable content will engage the consumer on each of these levels and success in each of these levels may be determined by evaluating consumer response to content for each of these categories.

Once the code frame has been generated by the code frame module 240 (also referred to as code framing module 240), online content having a relatively low CRS, which is similar to the type of content used to generate the code frame, may be applied to the content to increase the CRS for the content.

In some instances, a semiotic analysis may be performed on the online content with the low CRS to determine the narrative, theme, and underlying message categories for the online content. If the code frame module 240 can determine discrepancies between the code frame and the categories of the online content, the code frame module 240 may identify what categories need improvement. In other instances, marketers may utilize the code frame as a guideline for correcting defective content (e.g., content that is not being shared adequately).

According to some embodiments, the code frame may be used by marketers to generate online content from scratch. Thus, the code frame may be used as a template to create content that is highly likely to be shared.

Figure 4:
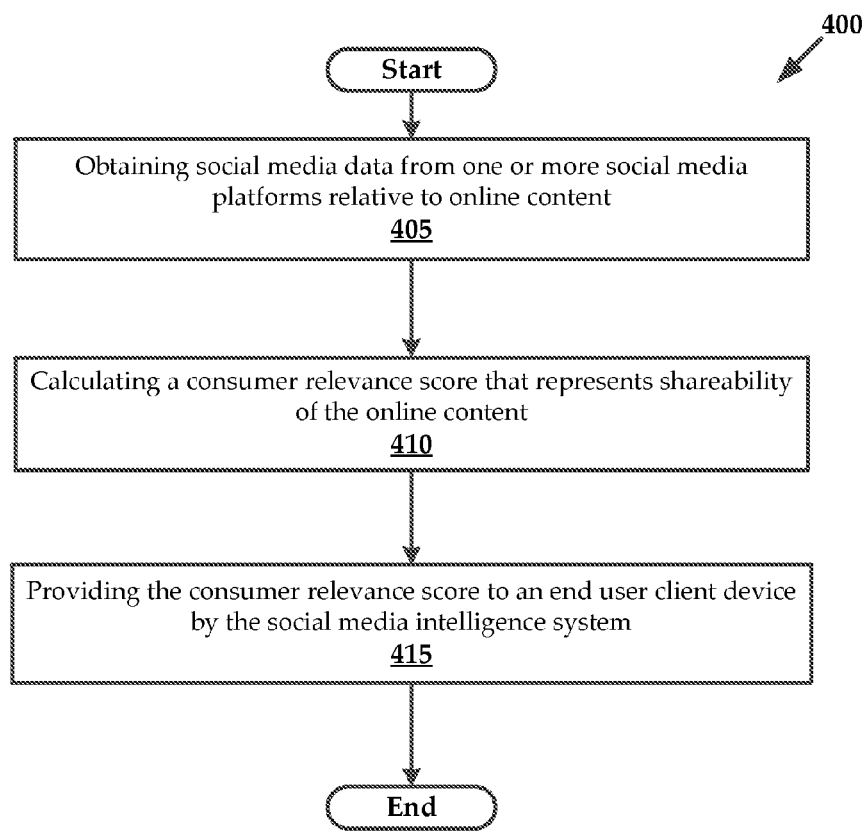
FIG. 4 is a flowchart of an exemplary method for determining the shareability of online content.

FIG. 4 is a flowchart of an exemplary method 400 for determining the shareability of online content. For purposes of context, the method 400 may be executed with the context of a social media intelligence system, such as the system 100 described above with reference to FIG. 1. The method may comprise a step 405 of obtaining social media data from one or more social media platforms relative to online content. The social media data may be gathered from social networks, websites, messages, or other media used to exchange social messages or conduct conversations. Analytics regarding content sharing may also be obtained.

Once the social media data has been gathered, the method 400 may comprise a step 410 of calculating a customer relevance score that represents shareability of the online content. Next, the method 400 may comprise a step 415 of providing the customer (or consumer) relevance score to an end user client device by the social media intelligence system. Again, the CRS calculated for the online content may be an average CRS that accounts for all social media data gathered for the online content.

Figure 5:
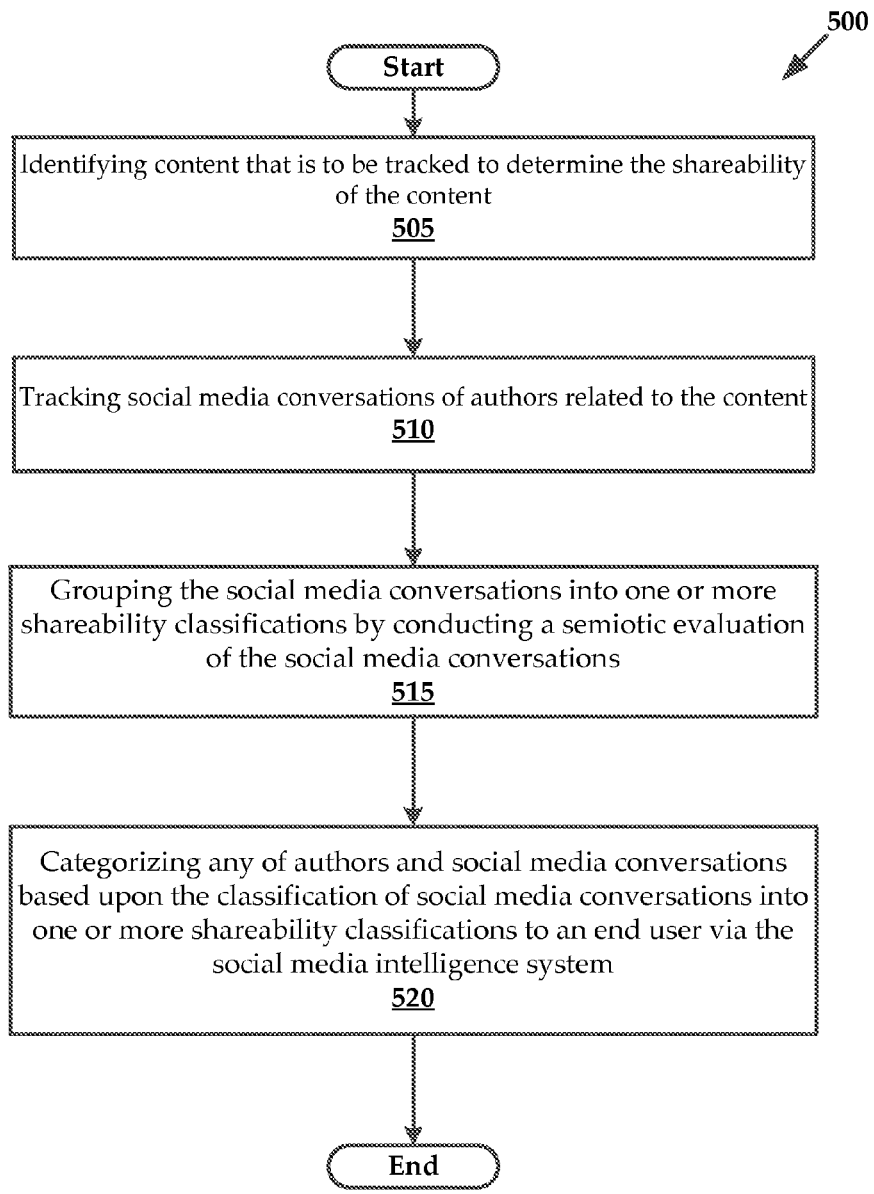
FIG. 5 is a flowchart of another exemplary method for determining the shareability of online content.

FIG. 5 is a flowchart of another exemplary method 500 for determining the shareability of online content. The method may comprise a step 505 of identifying content that is to be tracked to determine the shareability of the content. Next, the method 500 may comprise a step 510 of tracking social media conversations of authors related to the content. Again, these conversations may occur within the context of a social network or website. For example, conversations may include end user commentary related to a video that was posted to a social network feed for a particular consumer. The act of posting the video is sharing of the content and the remarks generated by the posting of the content may also reflect that the content is being shared by others.

Next, the method 500 may comprise a step 515 of grouping the social media conversations into one or more shareability classifications by conducting a semiotic evaluation of the social media conversations. Additionally, the method 500 may comprise a step 520 of categorizing any of authors and social media conversations based upon the classification of social media conversations into one or more shareability classifications to an end user via the social media intelligence system.

Figure 6:
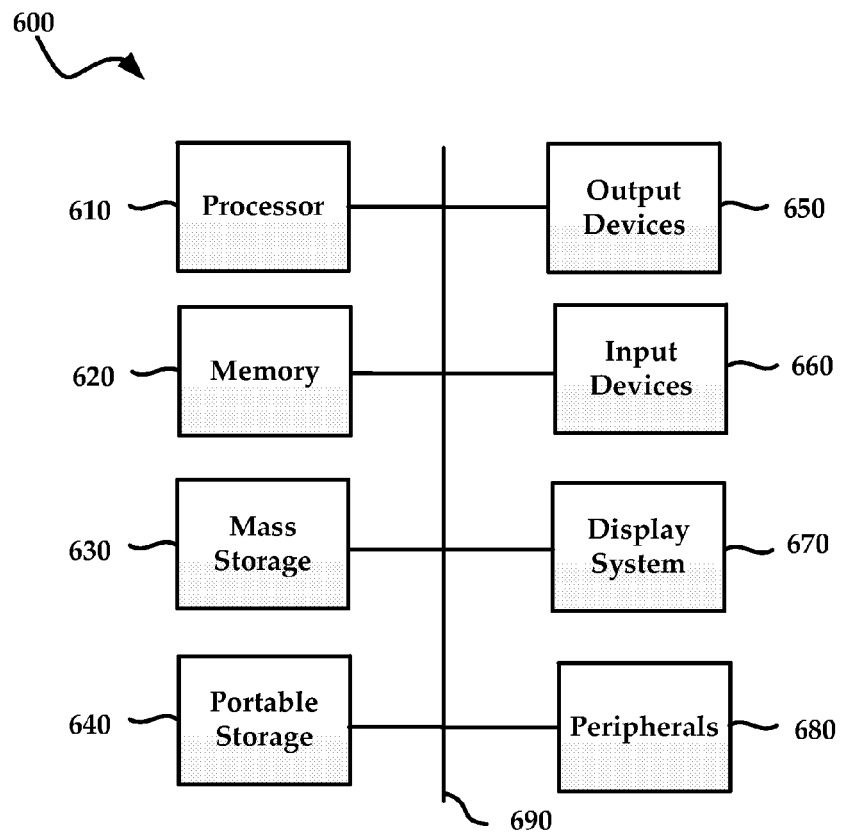
FIG. 6 is a block diagram of an exemplary computing system for implementing embodiments of the present technology.

FIG. 6 illustrates an exemplary computing system 600 that may be used to implement an embodiment of the present technology. The computing system 600 of FIG. 6 may be implemented in the contexts of the likes of computing systems, networks, servers, or combinations thereof disclosed herein. The computing system 600 of FIG. 6 includes one or more processors 610 and main memory 620. Main memory 620 stores, in part, instructions and data for execution by processor 610. Main memory 620 may store the executable code when in operation. The computing system 600 of FIG. 6 further includes a mass storage device 630, portable storage medium drive(s) 640, output devices 650, user input devices 660, a display system 670, and peripheral devices 680.

The components shown in FIG. 6 are depicted as being connected via a single bus 690. The components may be connected through one or more data transport means. Processor unit 610 and main memory 620 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive or an optical disk drive, is a non-volatile storage device for storing data and instructions for use by processor unit 610. Mass storage device 630 may store the system software for implementing embodiments of the present technology for purposes of loading that software into main memory 620.

Portable storage device 640 operates in conjunction with a portable non-volatile storage medium, such as a floppy disk, compact disk, digital video disc, or USB storage device, to input and output data and code to and from the computing system 600 of FIG. 6. The system software for implementing embodiments of the present technology may be stored on such a portable medium and input to the computing system 600 via the portable storage device 640.

Input devices 660 provide a portion of a user interface. Input devices 660 may include an alphanumeric keypad, such as a keyboard, for inputting alpha-numeric and other information, or a pointing device, such as a mouse, a trackball, stylus, or cursor direction keys. Additionally, the system 600 as shown in FIG. 6 includes output devices 650. Suitable output devices include speakers, printers, network interfaces, and monitors.

Display system 670 may include a liquid crystal display (LCD) or other suitable display device. Display system 670 receives textual and graphical information, and processes the information for output to the display device.

Peripherals 680 may include any type of computer support device to add additional functionality to the computer system. Peripheral device(s) 680 may include a modem or a router.

The components provided in the computing system 600 of FIG. 6 are those typically found in computer systems that may be suitable for use with embodiments of the present technology and are intended to represent a broad category of such computer components that are well known in the art. Thus, the computing system 600 of FIG. 6 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Macintosh OS, Palm OS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for determining shareability of online content, the method comprising:
    obtaining, via a social media intelligence system, social media data from one or more social media platforms relative to online content, wherein the social media data is obtained by: tracking social media conversations for a plurality of authors and sharing of the online content, each of the social media conversations having an author;
    calculating an author rank for each author by determining an influence for the author;
    dividing the author rank for each author by a sum of author ranks for the plurality of authors to calculate an adjusted author rank score;
    evaluating keywords in the social media conversations to classify the social media conversations into one or more shareability classifications that consist of interested, connected, and sharing;
    determining a distribution of social media conversations into each of the one or more shareability classifications to determine a shareability level for the online content;
    calculating, via the social media intelligence system, a customer relevance score that represents shareability of the online content wherein the customer relevance score is calculated using the author rank, the adjusted author rank score, the distribution of social media conversations, and the keywords; and
    providing the customer relevance score to an end user client device by the social media intelligence system.

2. The method according to claim 1, wherein calculating the customer relevance score for the author further comprises:
    (a) multiplying the adjusted author rank score with three weighted components comprising an interested weight component, a connected weight component, and a sharing weight component; and
    (b) multiplying a product of (a) with a sentiment score for the author.

3. The method according to claim 1, further comprising generating a code frame for the online content by:
    evaluating narrative, theme, and underlying message categories for the online content using semiotic analysis; and
    generating a code frame for the online content from any of the narrative, theme, and underlying message categories.

4. A system for determining shareability of online content, the system comprising:
    at least one server comprising a processor configured to execute instructions that reside in memory, the instructions comprising:
        a data gathering module that tracks social media conversations regarding the online content and obtains social media data from one or more social media platforms relative to online content; and
        a customer relevance score module that:
        evaluates keywords in the social media conversations to classify the social media conversations into one or more shareability classifications, the shareability classifications consisting of interested, connected, and sharing;
        determines a distribution of social media conversations into each of the one or more shareability classifications to determine a shareability level for the online content;
        calculates a customer relevance score that represents shareability of the online content by:
            (a) calculating an author rank for an author by determining an influence for the author;
            (b) dividing the author rank for the author by a sum of author ranks for a plurality of authors to calculate an adjusted author rank score;
            (c) multiplying the adjusted author rank score with three weighted components comprising an interested weight component, a connected weight component, and a sharing weight component; and
            (d) multiplying a product of (c) with a sentiment score for the author; and
        provides the customer relevance score to an end user client device.

5. The system according to claim 4, wherein the customer relevance score module calculates an average of customer relevance scores for a plurality of consumers to determine the shareability of the online content for the plurality of consumers.

6. The system according to claim 5, further comprising a code framing module that generates a code frame for increasing the customer relevance score for the online content based upon the classification of the social media conversations about the online content by:
    locating similar online content with a higher customer relevance score compared to the online content;
    evaluating narrative, theme, and underlying message conversation categories for the similar online content with the higher customer relevance score;
    comparing the underlying message conversation categories for the similar online content with the higher customer relevance score to the same underlying message conversation categories for the online content; and
    generating a code frame for the online content based upon the comparison.

* * * * *